United States Patent
Akers

(10) Patent No.: US 6,256,895 B1
(45) Date of Patent: Jul. 10, 2001

(54) LASER LEVELING SYSTEM, APPARATUS AND METHOD FOR BUILDING CONSTRUCTION

(76) Inventor: Paul Akers, 1730 Squalicum Mt. Rd., Bellingham, WA (US) 98226

( * ) Notice: Subject to any disclaimer, the term of this patent is extended or adjusted under 35 U.S.C. 154(b) by 0 days.

(21) Appl. No.: 09/227,414

(22) Filed: Jan. 8, 1999

Related U.S. Application Data

(60) Provisional application No. 60/070,765, filed on Jan. 8, 1998.

(51) Int. Cl.[7] .................................................. G01C 15/00
(52) U.S. Cl. ............................................. 33/286; 33/290
(58) Field of Search ............................. 33/286, 290, 293, 33/406, DIG. 21, 281, 285, 296, 809, 488

(56) References Cited

U.S. PATENT DOCUMENTS

| | | | |
|---|---|---|---|
| 2,661,653 | * | 12/1953 | Castiglia .............................. 356/249 |
| 3,559,336 | * | 2/1971 | Zenkichi Nozaki ................ 446/356 |
| 3,588,249 | * | 6/1971 | Studebaker ........................ 356/4.08 |
| 3,612,700 | * | 10/1971 | Nelson ................................ 356/153 |
| 3,631,601 | * | 1/1972 | McNulty ............................. 356/153 |
| 3,771,876 | * | 11/1973 | Ljungdah et al. ................. 356/138 |
| 3,775,929 | * | 12/1973 | Roodvoets et al. ................. 52/747.1 |
| 3,815,250 | * | 6/1974 | Roodvoets et al. ................... 33/286 |
| 3,897,637 | * | 8/1975 | Genho ................................. 356/138 |
| 3,907,435 | * | 9/1975 | Roodvoets .......................... 356/153 |
| 4,142,798 | * | 3/1979 | Barbee, Jr. .......................... 356/138 |
| 4,183,667 | * | 1/1980 | Denton ................................ 356/250 |
| 4,338,728 | * | 7/1982 | Valead ................................... 33/406 |
| 4,679,937 | * | 7/1987 | Cain et al. ........................... 356/138 |
| 4,718,171 | * | 1/1988 | Schlemmer et al. .................. 33/290 |
| 4,757,616 | * | 7/1988 | Hills ..................................... 33/488 |
| 4,854,704 | * | 8/1989 | Funazaki et al. .................... 356/250 |
| 4,891,888 | * | 1/1990 | Maria De Bree et al. ............ 33/293 |
| 4,899,452 | * | 2/1990 | Schafer ................................ 33/296 |
| 5,038,493 | * | 8/1991 | Stabs .................................... 33/809 |
| 5,212,889 | * | 5/1993 | Lysen ................................... 33/286 |
| 5,272,814 | * | 12/1993 | Key ....................................... 33/290 |
| 5,317,813 | * | 6/1994 | Reed ..................................... 33/809 |
| 5,359,781 | * | 11/1994 | Melville ............................... 33/286 |
| 5,461,793 | * | 10/1995 | Melville ............................... 33/286 |
| 5,533,268 | * | 7/1996 | Keightley ............................ 33/290 |
| 5,539,990 | * | 7/1996 | Le ........................................ 33/283 |
| 5,566,459 | * | 10/1996 | Breda ................................... 33/290 |
| 5,621,531 | * | 4/1997 | Van Andel et al. ................. 356/399 |
| 5,653,415 | * | 8/1997 | Schworer ............................. 33/493 |
| 5,819,424 | * | 10/1998 | Ohtomo et al. ..................... 33/290 |
| 5,872,657 | * | 2/1999 | Rando ................................... 33/286 |

OTHER PUBLICATIONS

Laser slide, "Momentum Laser", No date.*

* cited by examiner

*Primary Examiner*—Diego Gutierrez
*Assistant Examiner*—Quyen Daon
(74) *Attorney, Agent, or Firm*—Hughes & Schacht, P.S.; Robert B. Hughes; Michael R. Schacht

(57) ABSTRACT

A leveling assembly to establish elevations in a building structure for installing cabinets, bookshelves, countertops, etc. There is a telescoping mounting post adapted to be positioned in bearing engagement between a floor surface and the top of a doorway, ceiling or other upper surface. A laser that transmits a horizontal laser beam is mounted to a mounting device that can be moved to different positions along the length of the post. Locking devices hold the laser mounting device in place, and also properly position the post to be in firm engagement with its bearing surfaces. The laser mounting device can be swung to upper and lower positions.

43 Claims, 8 Drawing Sheets

FIG. 2
FIG. 3
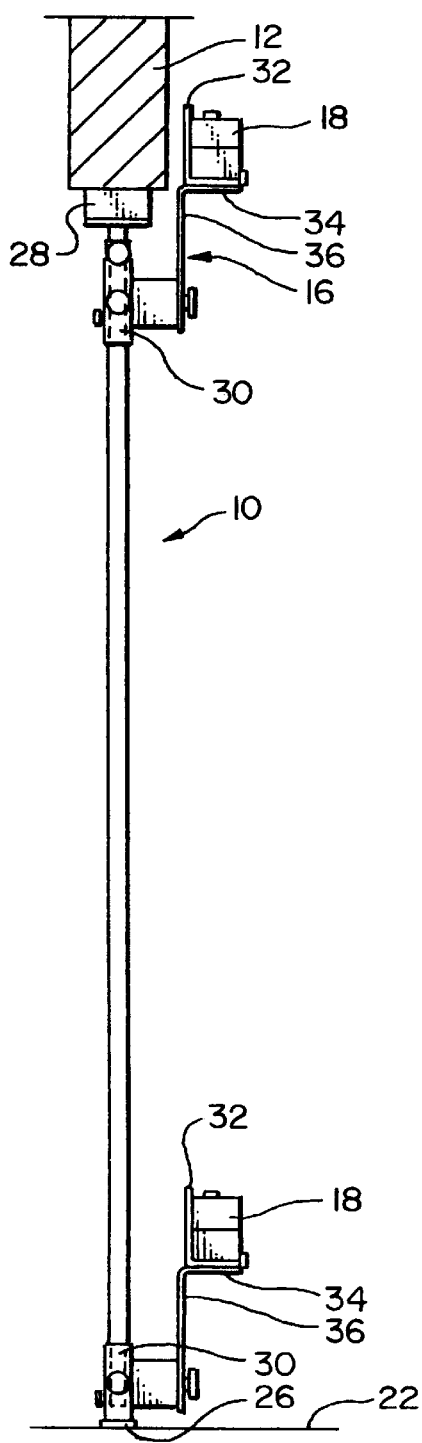
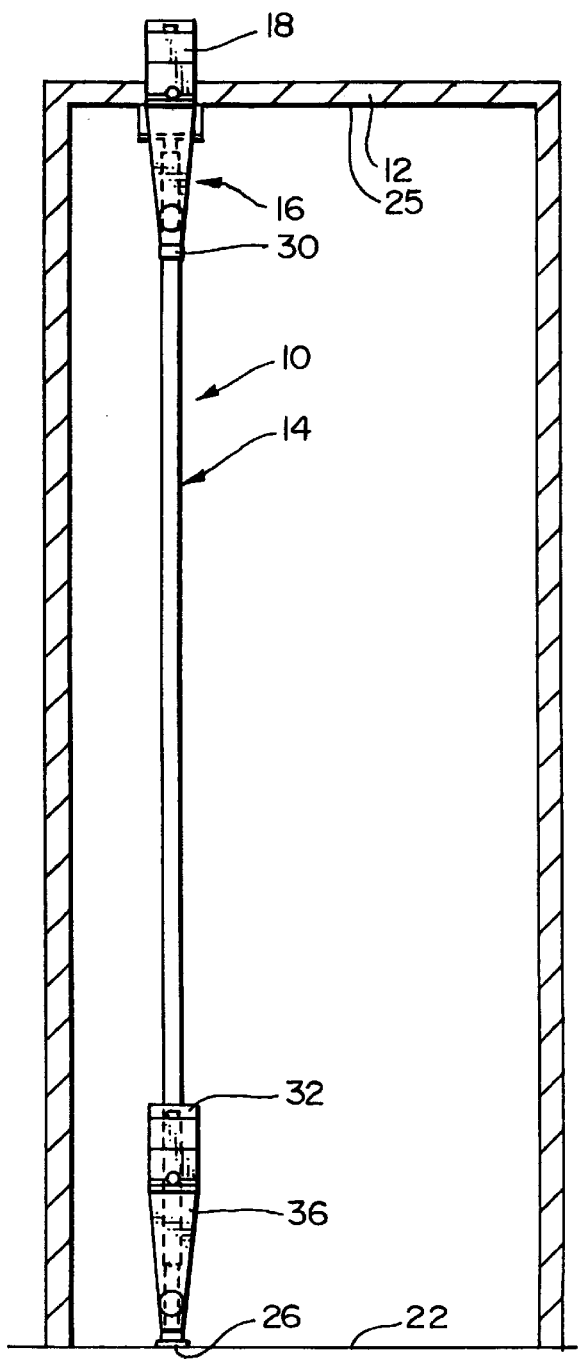

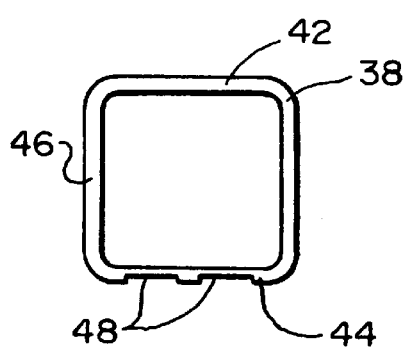
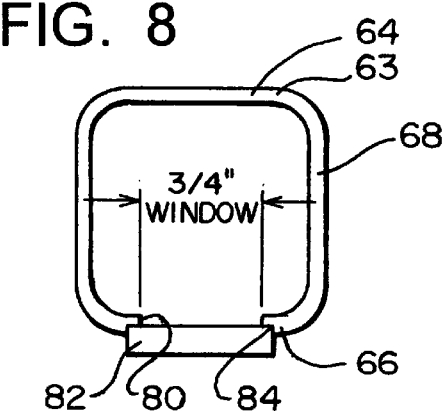
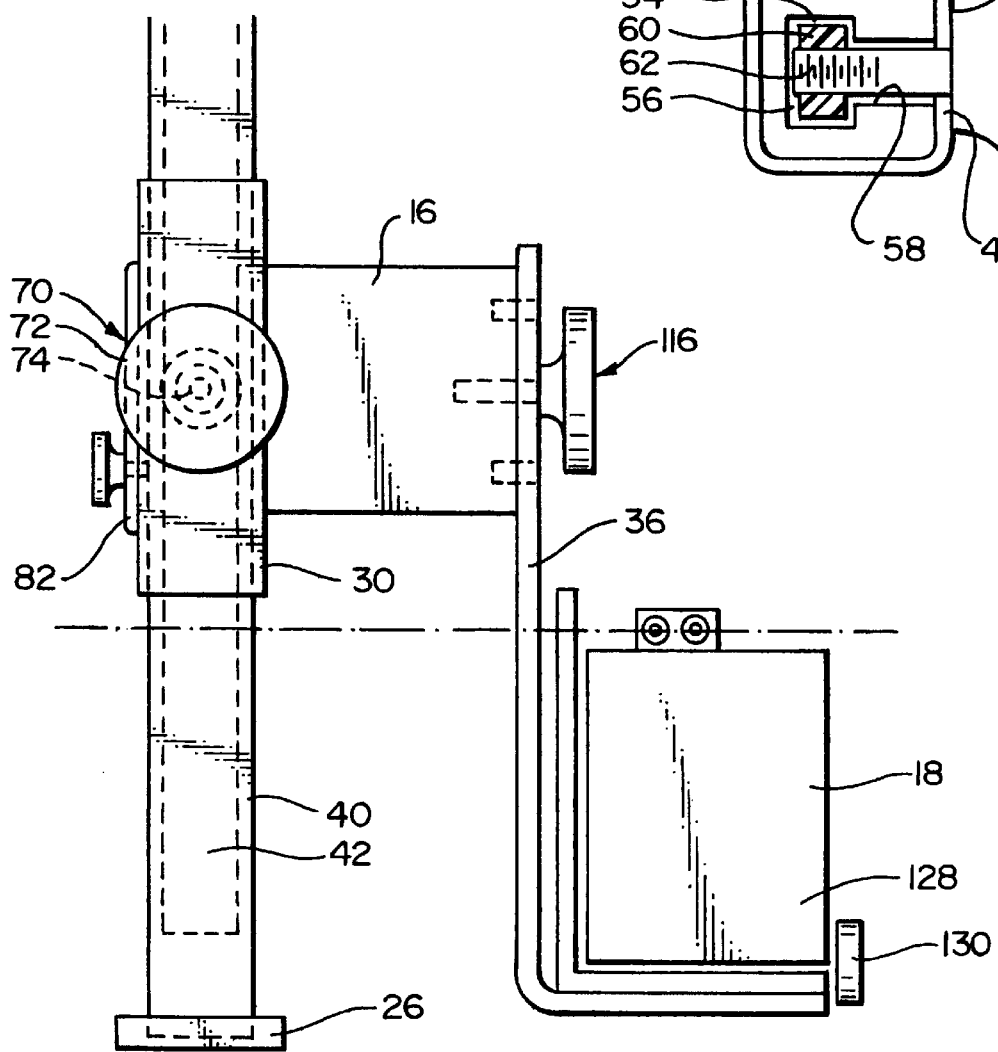

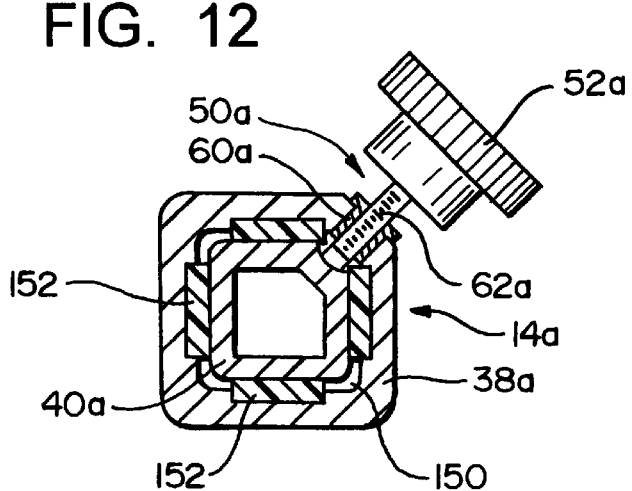
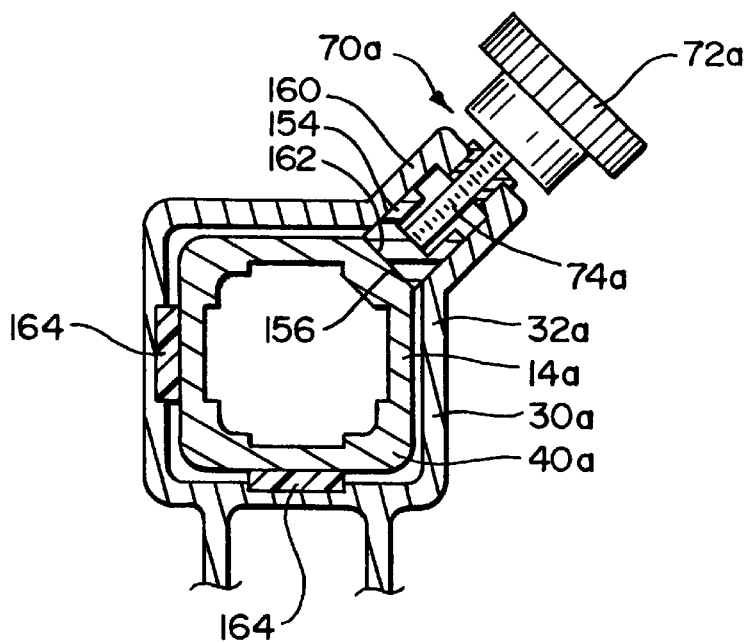
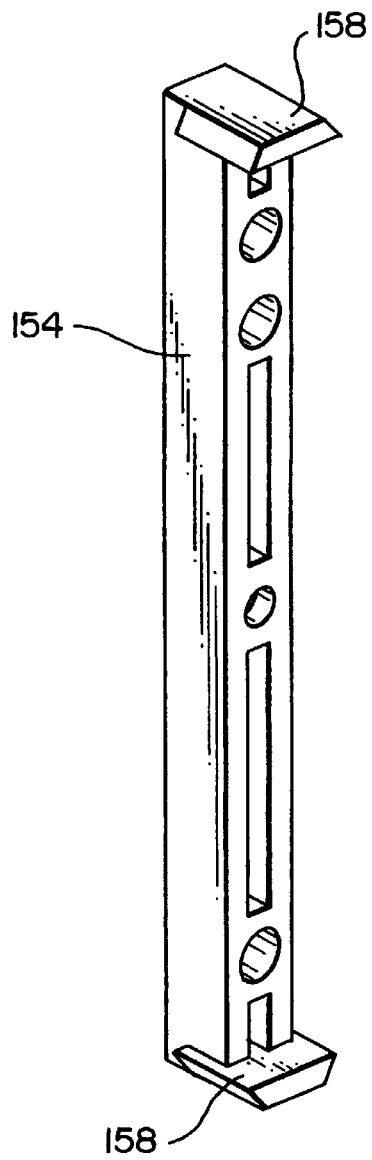

LASER LEVELING SYSTEM, APPARATUS AND METHOD FOR BUILDING CONSTRUCTION

This Appln claims the benefit of Provisional No. 60/070, 765 filed Jan. 8, 1998.

BACKGROUND OF THE INVENTION a) Field of the Invention

The present invention relates to a laser leveling system, apparatus and method particularly adapted for use in construction projects, and more particularly for construction projects where it is necessary to position a variety of components of the building structure at various locations and at specific height locations (e.g. cabinets, bookshelves, countertops, etc.).

b) Background Art

There are numerous situations in the construction industry where it is necessary to ascertain elevation locations, and also to locate various components at precise elevations. This is a task that confronts surveyors, carpenters, brick layers, and others.

The surveyor commonly uses a leveling instrument which is mounted to the top end of a tripod so as to rotate about a vertical axis while maintaining its horizontal orientation within close tolerances. Also, a conventional surveyor's transit will commonly be designed to function as a leveling instrument. These surveying instruments are usually used to place the foundation and possibly other elements of the building at the proper location and elevation. Then, as the more specific components are put into place, other locating and leveling techniques are commonly used.

A typical example is where a carpenter or cabinet maker is installing cabinets, countertops, bookshelves, etc. A common technique is to use chalk lines where a vertical elevation is established, such as measuring up a certain distance from the floor level. Then the countertops, cabinets, and other components are positioned using this chalk line as a elevation reference. The chalk line can be positioned by use of establishing one vertical location, and then using a carpenter's level to align the chalk line horizontally. Another method is simply to establish two vertical locations independently (e.g. by measuring ascertain distance up from the floor level at different locations), then making elevation marks, and stringing the chalk line between the marks.

For a number of decades, optical tooling has been used to establish locations and also elevations. Within more recent years, laser instruments have been utilized for this purpose. A search of the patent literature disclosed various concepts relating to the use of laser instruments in establishing elevations and performing other functions. These are as follows:

U.S. Pat. No. 5,566,459 (Breda) shows a laser sighting device in a housing provided with spirit levels so that the device can be leveled and aligned. There are optical elements provided so that a beam can be projected in the desired path.

U.S. Pat. No. 5,533,268 (Keightley) shows a laser sighting device that "draws" a line in both a horizontal and vertical path for use in compound surfaces such as large chemical reaction chambers. The mirror is adjusted in two planes as it rotates.

U.S. Pat. No. 5,272,834 (Key) shows a surveying device which is mounted to a tripod and in which the user can observe alight beam on the surface of surveyor's rod 14.

U.S. Pat. No. 4,718,171 (Schlemmer) shows a rotating laser beam system in which the laser beam is projected onto a staid which is provided with optical sensors 7 that provide an indication of height displayed in an output 3. This also is mounted to a tripod.

U.S. Pat. No. 3,588,249 (Studebaker) shows a right angle rotating light directing means such as a mirror or pentaprism 82. The light directing means is mounted on a rotating hollow shaft through which a laser directs light straight upward to the right angle directing means. The device is secured to an easily adjusted leveling means, and it is shown being mounted to a mobile vehicle and also to a tripod.

U.S. Pat. No. 2,661,653 (Castiglia) shows a light projecting device which is provided with a bubble level 6, that allows the device to be aligned. The device is provided with a housing that can be rotated by hand to point in any direction. The light beam is aimed at a target placed on a floor, and as the target is moved the misalignment of the floor can be measured. The device of course could be used as is the instant invention to establish alignment points on a wall or the like.

U.S. Pat. No. 4,183,667 (Denton) shows what is called a "light-ray indicator" and is supported by a universal joint, with a weight at the lower end so as to seek a plumb line.

The following five patents also relate in general in laser/optical leveling devices, and deal mostly with improvements to the leveling apparatus itself. These are the following:

U.S. Pat. No. 5,539,990 (Le)

U.S. Pat. No. 5,212,889 (Lysen)

U.S. Pat. No. 4,854,704 (Funazaki et al.)

U.S. Pat. No. 4,679,937 (Cain et al.)

U.S. Pat. No. 3,771,876 (Ljungdahl et al.)

To the best knowledge of the applicant herein, while various precision leveling instruments have been available for many, many decades (and even centuries), and although optical/laser leveling devices have also been available for decades, many tasks that are performed on a day to day basis in the construction industry where it is required to establish height elevations within reasonably close tolerances do not employ these types of instruments. Rather, the use of chalk lines, carpenter levels, tape measurers (measuring a vertical distance from a base location), etc. continue to be commonly used.

A typical instance is where a skilled carpenter or cabinet maker is installing cabinets, countertops, bookshelves and other articles. In large part, the more sophisticated leveling instruments that have been available for many decades or centuries as well as the more recent optical/laser leveling systems, which have been available for many years, carpenters and cabinet makers in large part still rely on the simpler methods as indicated above (plumb lines, leveling instruments, measuring from floor level, etc.).

Accordingly, it is an object of the present invention to provide a system, apparatus and method which incorporates a laser instrument where there is a balance of desirable features which makes it particularly convenient, "user-friendly", and efficient, and also a system where the set-up and use at various locations can be accomplished quickly and easily.

The present invention was developed to meet this need.

SUMMARY OF THE INVENTION

The laser leveling assembly of the present invention is used to establish height locations at selected locations, and it is particularly adapted for use at a location where there is a lower upwardly facing support surface and an upper downwardly facing bearing surface, such as a building structure having a floor support surface, and an upper bearing surface, such as an upper section of a doorway, a ceiling or an upper panel or member.

The laser assembly comprises a laser instrument to transmit a horizontally directed laser beam at laterally spaced locations to indicate a selected elevation or elevations at such spaced locations.

There is a mounting post having a longitudinal axis. This post comprises a lower contact end arranged to engage the lower support surface to establish a lower mounting location for the post. The post further comprises an upper contact end portion arranged to engage the upper bearing surface to establish an upper mounting location for the post so that the post can be positioned between the upper and lower locations so as to have a substantial vertical alignment component. Also, the mounting post provides a guideway extending along the longitudinal axis.

There is an instrument mounting device mounted to the post for movement along the guideway to a selected height position or positions. The mounting device is arranged to support the instrument in an operating position where the instrument can transmit the laser beam toward laterally spaced locations.

In a preferred form, one of the contact ends of the post is longitudinally adjustable so that the contact ends can be moved toward and away from one another. More particularly, in the preferred form the post comprises a first elongate post section connecting to the first contact end portion, and a second post section telescopically engaging the first post section and having the upper contact end.

The mounting device in the preferred form comprises a post engaging portion arranged to be fixedly positioned to the post and arranged to be able to move along the guideway of the post. There is an instrument mounting portion arranged to mount the instrument in its operating position. There is also an intermediate mounting portion connecting the post engaging portion and the instrument mounting portion.

In the preferred form, the intermediate mounting portion is arranged so that the instrument mounting portion can be located at different vertical locations relative to the post engaging portion.

In a preferred embodiment, the intermediate mounting portion comprises a support arm rotatably mounted so as to be able to rotate between an upper arm position to support the instrument mounting portion in an upper location and a lower arm location to support the instrument mounting portion at a lower location. More specifically, the intermediate mounting portion comprises a laterally extending offset mounting member to locate the instrument mounting portion at a location spaced laterally from the mounting post so that the instrument mounting portion would be able to move clear of an object located closely adjacent to the mounting post.

In a specific form, the intermediate mounting portion comprises a vertically oriented mounting member to be able to support said instrument mounting portion at height locations spaced laterally from the post engaging portion. The vertically oriented mounting portion is adjustable so as to be able to position the instrument mounting portion either above or below the elevation of the post engaging portion.

As a further feature, the mounting post has an elevation indicating portion positioned along the longitudinal axis of the post to indicate vertical location relative to the post. The mounting device has a height indicating device positioned to enable height location of the mounting device to be determined. In a preferred form, the elevation indicating portion has indicia increasing from a lower location to an upper location to indicate distance from a lower location, and also indicia increasing from an upper location toward a lower location to indicate distance from the upper location to the lower location.

The mounting device in a preferred form comprises a post engaging portion extending at least partially around the post, and providing a height indication device positioned adjacent to the distance indicating portion. More specifically, the height indicating device is mounted so as to be vertically adjustable relative to the post engaging portion. More specifically, said height indicating device comprises a vertically moveable transparent member with a height indicator thereon.

There is a post locking and stabilizing device comprising a threaded rotatable member which is mounted to the post and which can be rotated into and out of locking engagement to insert a lateral force relative to said telescoping members when in locking engagement. The assembly further comprises an instrument mounting locking device which operably engages the mounting device and the post and which comprises a rotatable threaded member to come into locking engagement between said instrument mounting device and said post.

In the method of the present invention, the assembly as recited above is employed. The laser instrument is mounted to the instrument mounting device which in turn is mounted to the post. The post is positioned so that the lower contact end of the post engages a lower support surface, and an upper contact end portion of the post engages the upper bearing surface so that the post is positioned between the upper and lower locations so as to have a substantial vertical alignment component, with the post providing a guideway extending the longitudinal axis.

The laser instrument is placed at the proper location on the post, and the laser instrument is then operated to direct a laser beam toward the location (e.g. a wall) where the elevation is to be established. Then the mounting device can be raised or lowered, placed in upper or lower locations relative to the mounting device, and adjustments made to facilitate the directing of the laser beam to the appropriate height location.

Other features of the present invention will become apparent from the following detailed description.

BRIEF DESCRIPTION OF THE DRAWINGS

FIG. 2 is a side elevational view of the apparatus of the present invention, installed in a doorway of a building, and showing the laser leveling instrument positioned at an upper location and also a lower location;

FIG. 3 is a front elevational view of the apparatus, as shown in FIG. 1;

FIG. 7 is a cross-sectional view taken along line 8—8 of FIG. 6, but showing only the mounting sleeve of the laser instrument mounting section;

FIG. 8 is a sectional view similar to FIG. 7 showing the slide member;

FIG. 9 is a sectional view taken along line 8—8 of FIG. 5 illustrating the locking and alignment mechanism between the main post and inner-telescoping member of the post section; and FIG. 10 is a view similar to FIG. 5, but showing the laser instrument mounted in an upright position, with the mounting device in its lower position;

FIG. 12 is a cross-sectional view of the post at the location of the post locking mechanism;

FIG. 13 is a cross-sectional view of the post at the location of the locking mechanism for the laser mounting instrument;

FIG. 14 is an isometric view of an insert shown in section in FIG. 13.

DESCRIPTION OF THE PREFERRED EMBODIMENT

Figure 1:
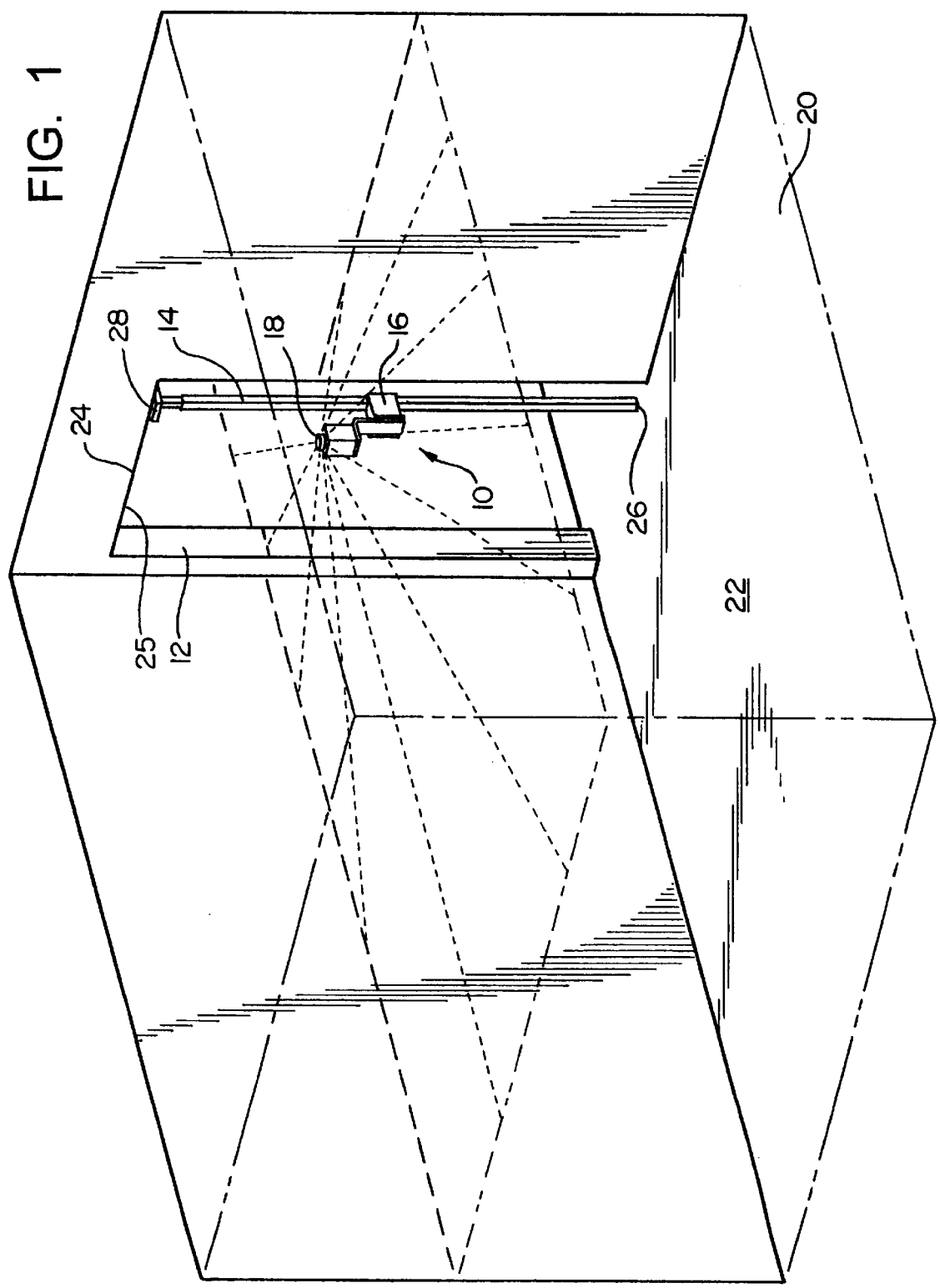
FIG. 1 is an isometric view showing the present invention, installed n a doorway, being used to position some kitchen cabinets.

With reference initially to FIGS. 1,2 and 3 the apparatus 10 of the present invention is shown mounted in a doorway 12 in its operating position. This apparatus 10 comprises a post section 14, a laser mounting section 16, and a laser instrument 18.

In FIGS. 1–3, there is shown the floor 20 having an upwardly facing surface 22 and an upper doorway member 24 having a downwardly facing bearing surface 25. The post section has a lower contact end 26 pressing against the floor surface 22, and an upper contact end 28 pressing upwardly against the bearing surface 25 of the upper doorway member 24. In the position of FIGS. 1–2, the post section 14 is held securely in vertical alignment between the surfaces 22 and 25.

The mounting section 16 and the laser instrument 18 are shown in FIGS. 2 and 3 in both a lower and an upper position (it being understood that normally there would be only one mounting section 16 and one laser instrument 18 in the apparatus 10). The mounting section 16 comprises a post engaging portion 30, and a laser mounting portion 32. The laser mounting portion 32 in turn can be considered to comprise a laser platform member 34 by which the laser instrument 18 is mounted, and an intermediate mounting portion 36 which interconnects the laser platform member 34 with the post engaging portion 30.

The post engaging portion 30 is slide mounted to the post section 16 and can be moved to various selected locations along the length of the post sections 14. To describe the post section 14 in more detail, this post section 14 comprises a main post 38 and an inner-telescoping post member 40, slide mounted within the main post 38. The aforementioned contact end 26 is at the lower end of the main post 38, and this contact end 26 can conveniently be provided as a relatively hard rubber or plastic electrically insulating pad having a high coefficient of friction so that it reliably engages the floor surface 22.

As shown in FIG. 7, the main post 38 has a square cross-sectional configuration, having a front wall 42, rear wall 44 and two sidewalls 46. The rear wall 44 is slightly recessed so as to form two shallow vertically extending channels, and there are two scales 48 (i.e. measuring tapes or rulers) having length markings thereon (either inches marked in increments of a quarter inch, an eighth inch, etc., in the metric system, or both). One scale 48 reads upwardly from the floor as a zero location, with the length designations increasing in an upward direction, and the other length marking member 48 has the markings increasing in lengthwise dimension from an upward location (the latter being used when one is measuring down from a ceiling location or other upper reference plane).

Figure 6:
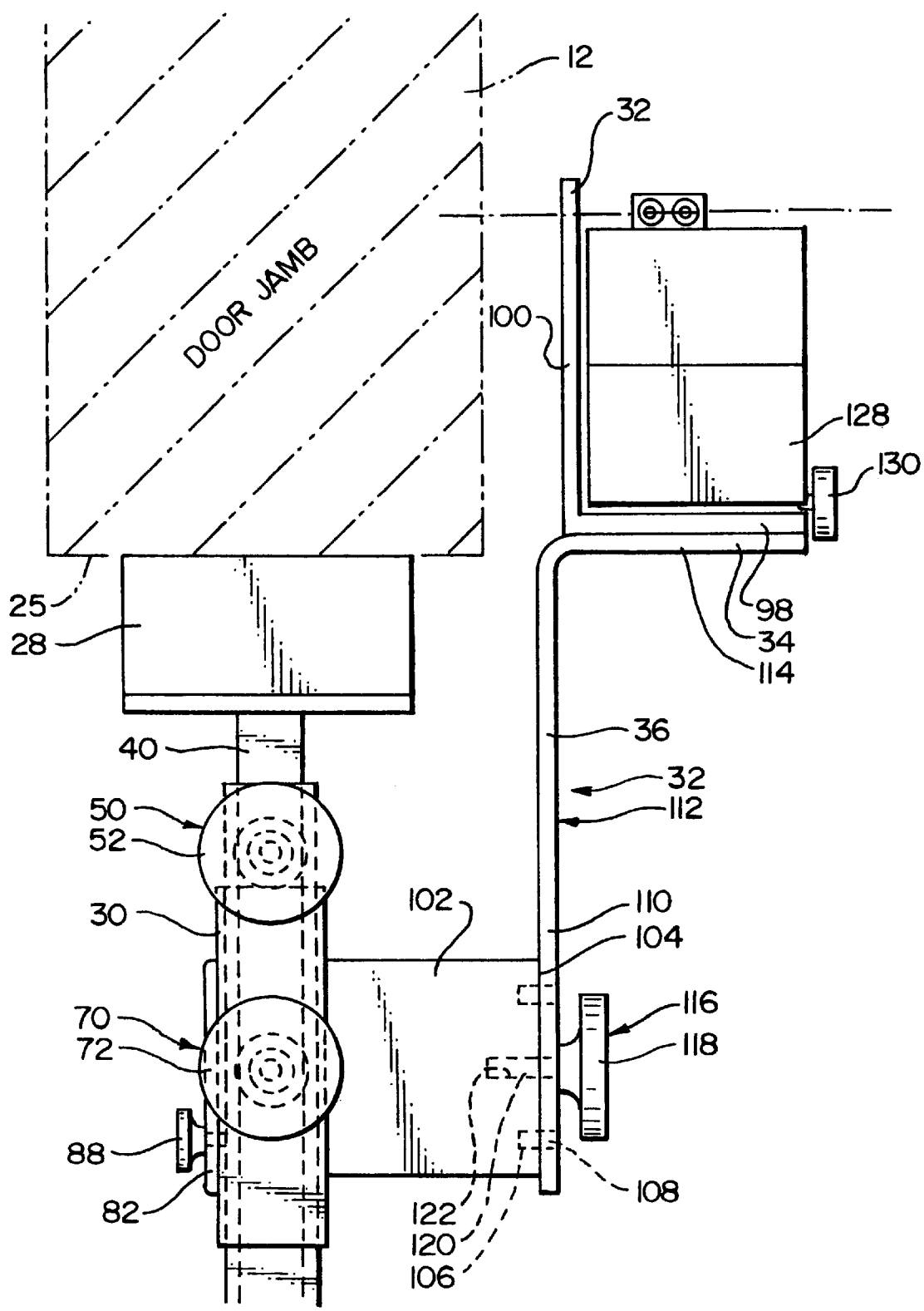
FIG. 6 is a side elevational view, drawn to an enlarged scale, showing the laser leveling instrument in the upper position, as shown in FIG. 2 (top part)

With reference to FIG. 6, it can be seen that the telescoping post member 40 engages at its upper end the upper contact end 28 which is shown herein as a moderately flexible rubber or plastic electrically insulating pad being moderately compressible and having a sufficiently high coefficient of friction to reliably engage the upper surface 25 of the upper door member 24 or other member or component (e.g. a ceiling of a room) which is to engage the upper contact end 28. In operation, when the post section 16 is mounted in its upright operating position, the post section 14 is (as shown in FIGS. 1–3) placed in a location such as a doorway, so as to be substantially vertically aligned. Then the upper telescoping member 40 is moved upwardly to press the upper contact end 28 against the downwardly facing upper surface 25 after which a post stabilizing and locking member 50 (FIGS. 6 and 9) is operated by turning the handle 52 of the member 50 so as to lock the main post 38 and the telescoping member 40 together in the positions so that the post section 14 is securely positioned between the floor surface 20, and the door member 25.

The inner-telescoping member 40 has a "U" shaped cross sectional configuration and defines an elongate slot 54 extending along the entire length of the member 40. This slot 54 has a "T" shape, so that the rear end of the slot has an expanded slot portion 56 and a necked down portion 58, so as to have a "T" shaped cross section. The locking member comprises a plastic insert 60, about six inches long and having a uniform "T" shaped cross section so that it fits snugly within the slot 54.

The aforementioned locking knob 52 connects to a threaded bolt member 62 which in turn fits in a threaded bore in the insert 60. The knob 52 is rotated to cause the threaded bolt member 62 to draw the insert 60 laterally so that it presses the telescoping member 40 firmly against the inside surface of the sidewall 44 of the main post 38. Then when it is desired to move the telescoping member 40, the knob 52 is rotated in the opposite direction to loosen the clamping insert 60 and permit slide movement of the telescoping post member 40.

Figure 11:
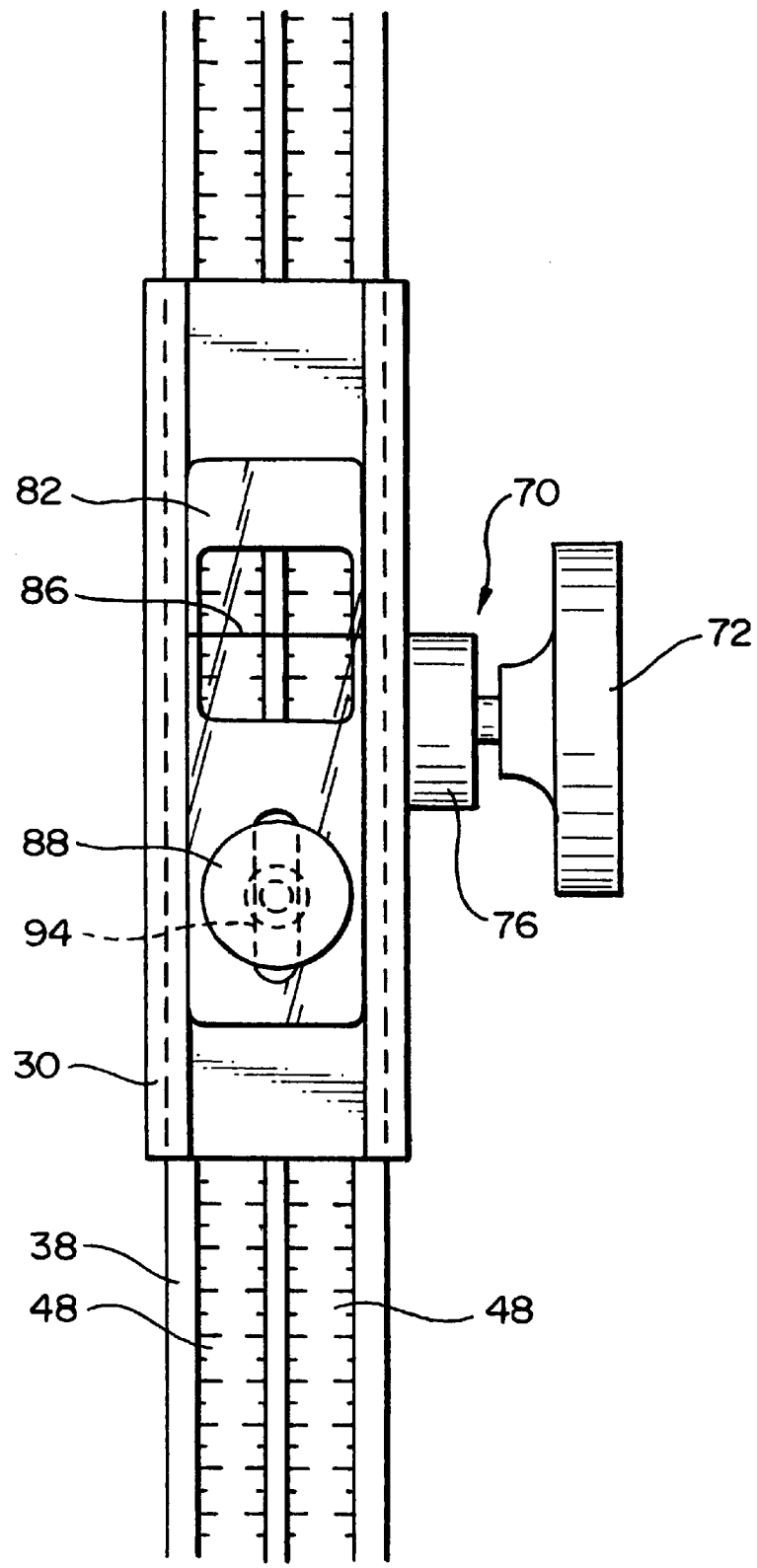
FIG. 11 is a rear elevational view drawn to an enlarged scale, showing the post mounting portion of the laser mounting section.

As indicated previously, the mounting section 16 comprises the post engaging portion 30 and the laser mounting portion 32. To describe the post engaging portion 30 in more detail, reference will now be made to FIGS. 8 and 11.

In FIG. 8, it can be seen that the post engaging portion 30 comprises a slide member 63 having a vertical dimension of about five inches and a square cross sectional configuration with rounded corner portions. The main post 38 functions as a guide way (or slide way) for the post engaging portion 30. The post engaging portion 30 comprises a front wall 64, a rear wall 66 and two side walls 68. Mounted to one side wall 68 is a locking device 70 (See FIGS. 4, 7 and 10) which comprises a knob 72 connected to a bolt 74 that is in turn threaded into a block 76 welded or otherwise secured to the side wall 68. The contact end of the bolt 74 has a hard rubber surface or other non-scoring material which bears against the side wall 46 of the main post 38. By rotating the knob 70, the bolt 74 moves inwardly to press against the side wall 46 of the main post 38 and hold the post engaging portion 30 in a fixed location relative to the main post 38.

The rear wall 66 of the slide member 63 is provided with a cut-out 80 (see FIGS. 8 and 11) to provide a window through which the operator can observe the height markings on the scales 48. A rectangular clear plastic plate 82 is positioned in a shallow recess 84 formed in the rear wall 66, and extending the entire length thereof and this clear plastic piece 82 has a horizontal reference line 86 which can be adjusted upwardly and downwardly by moving the clear plastic plate 82 either upwardly or downwardly.

To hold the plate 82 in place, there is provided a locking member 88 comprising a rotatable knob 90 connected to a threaded bolt member 92 that extends through an elongate slot 94 (see FIG. 10) formed in the clear plastic member 82, and into a threaded retaining socket in the member 63. By rotating the knob 90 to an unlocking position, the clear plate 82 can be adjusted upwardly or downwardly so as to properly locate the reference line 86 relative to the height location markings 48. When the clear plastic member 82 is at the desired location, then it can be locked in that position by rotating the knob 98 inwardly to engage the plastic member 82 and press it against the rear wall 66 of the mounting member 30. The plastic member 82 can be adjusted to place the reference line 86 at a desired reference location so that the person using the apparatus 12 is able to "fine tune" the reading of the elevation of the reference beam from the laser 18.

To continue the description of the mounting section 16, as indicated previously, there is the laser mounting portion 32, which in turn is made up of a laser platform member 34 and an intermediate mounting portion 36. The laser mounting platform 34 comprises an "L" shaped plate member comprising a horizontal plate portion 98 and a vertical plate portion 100, joined to one another in the "L" shaped configuration. The laser instrument 18 is, or may be, of conventional design, and it can be removably bolted or otherwise connected to the laser platform member 34.

The intermediate mounting portion 36 comprises first a laterally extending rectangular member 102 having its rear end welded or otherwise joined to the front wall 64 of the post engaging mounting portion 30. At the forward vertical surface 104 of the plate member 102 there is a pair of cylindrical pockets or recesses 106, each of which receives a locating pin 108. The locating pin 108 also fits within matching recesses in a vertical plate 110 of an "L" shaped member 112 which also comprises lateral plate 114. The horizontal plate 114 connects to the horizontal plate 98 of the laser platform member 34.

The mounting member 112 is held securely to the plate 108 by connecting member 116 comprising a rotatable handle 118 that is in turn connected to a bolt member 120 that fits in a matching threaded socket 122 in the mounting plate 108. By rotating the knob 118 inwardly, the bearing surface of the knob 118 bears against the plate member 110 to press it firmly against the forward surface 104 of the plate 102.

Figure 4:
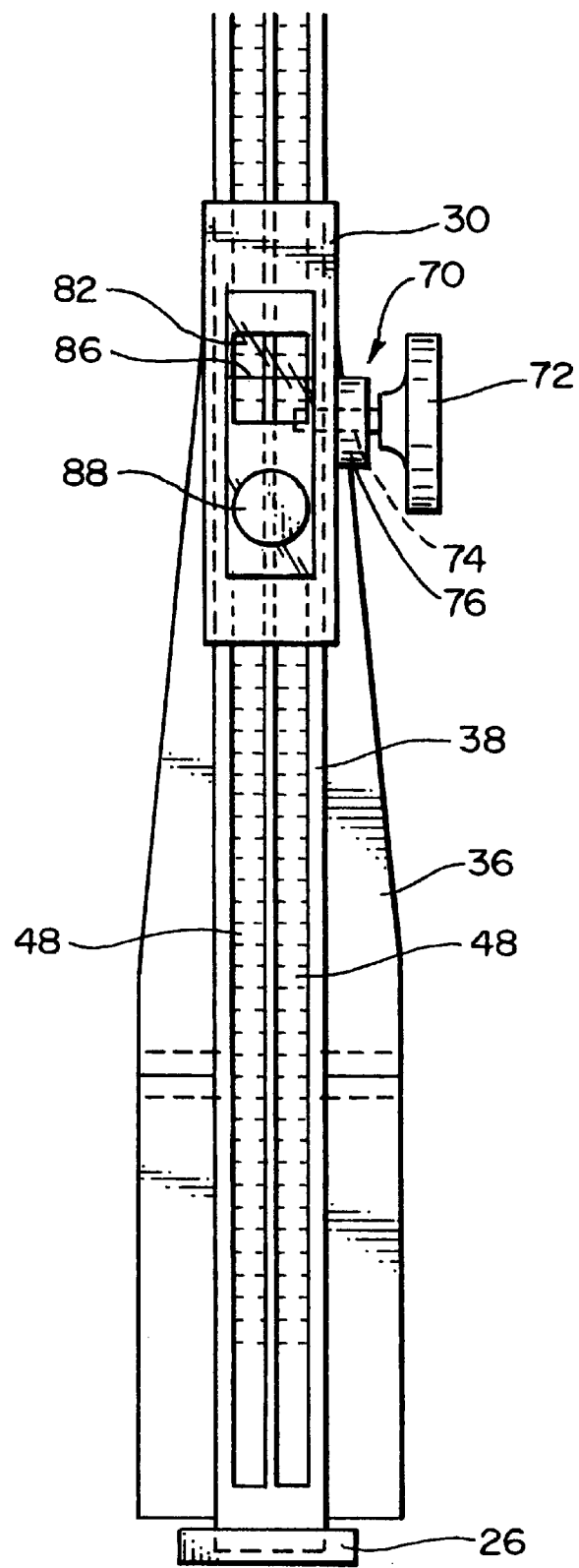
FIG. 4 is a side elevational view, drawn to an enlarged scale, showing the laser leveling apparatus in an inverted lower position.
Figure 5:
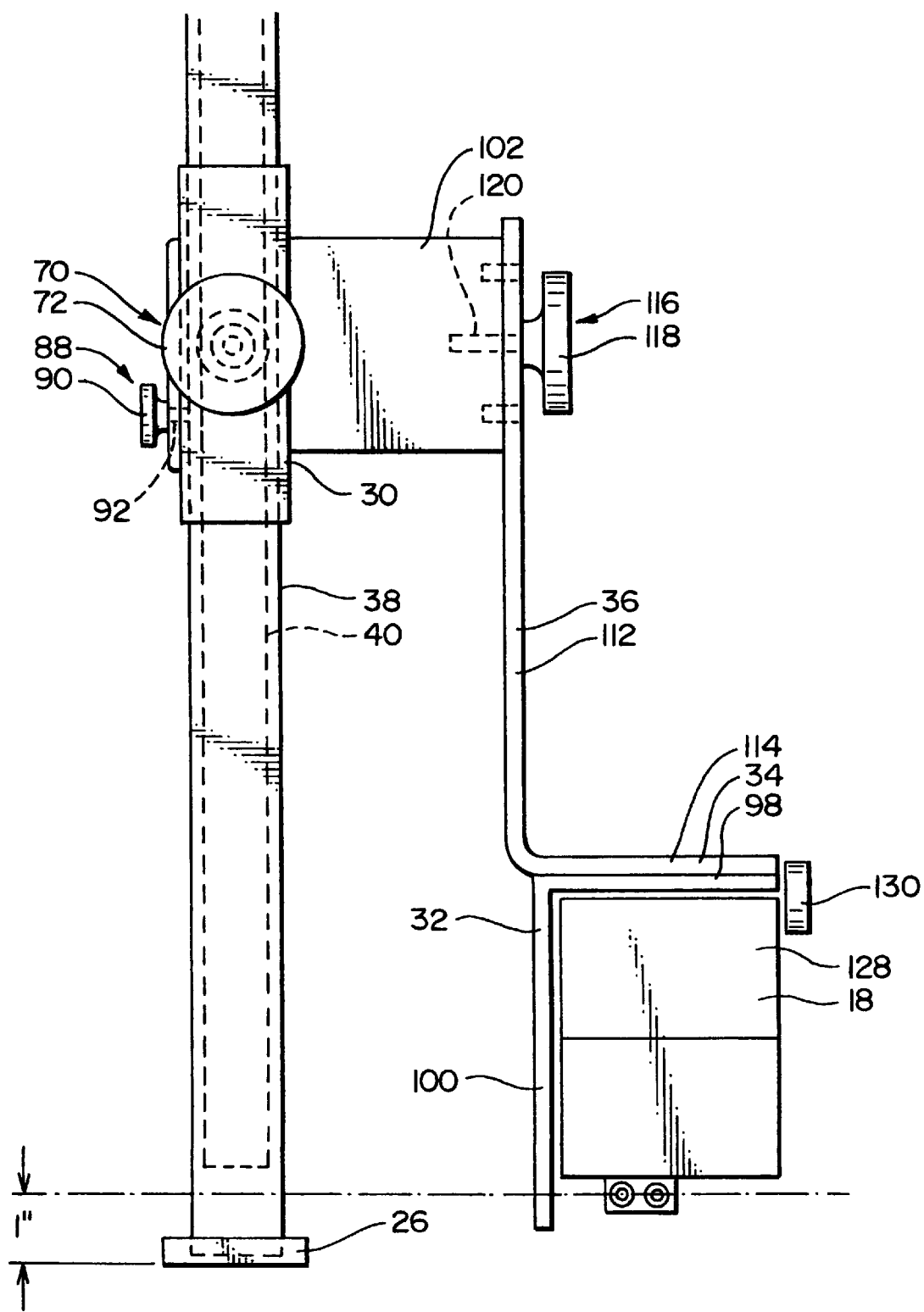
FIG. 5 is a side elevational view, drawn to an enlarged scale showing a laser leveling instrument in a non-inverted lower position.

The mounting section 16 is arranged so that the "L" shaped intermediate mounting member 112 can be inverted to the position of FIG. 4 simply by loosening the locking member 118 to its release position, and then inverting the intermediate member 112 from the position of FIG. 5 to the position of FIG. 3, and again relocking the member 112 in place. At the same time, the laser platform member 34 can be moved to the opposite side of the horizontal plate 114, as shown in FIG. 4, so as to properly position the laser instrument 18 in an upright position.

As indicated previously, the laser instrument 18 is, or may be, of a conventional design. The instrument 18 is provided with a suitable base structure indicated schematically at 128, where there is shown a single adjusting knob 130. This base 128 is provided with an adjustable leveling mechanism, such as that provided in a conventional surveyor's transit or leveling device, where there are leveling bubbles oriented to right angles to one another, and the instrument 18 can be adjusted to a level position within very close tolerances.

The laser instrument 18 is arranged to be battery operated, and it directs a laser beam horizontally, causing the beam to move laterally and scan a wide angular area.

To describe the operation of the present invention, let us take a typical example where there is a house under construction, and the construction process has progressed to where there is a bare wood floor, and the drywall of most of the room has been put in place. The next step is for a skilled carpenter to place various built-in cabinets, countertops, shelves, etc. The doorways have been constructed, but the doors have not yet been hung.

Let us assume that one of the first tasks for the carpenter is to install the built-in cupboards and countertops in the desirable countertop height of thirty six inches above the floor.

The apparatus 10 initially has the pole section 14 in its fully contracted section, where the telescoping post member 40 is fully retracted so that the overall length of the post section 14 is somewhat less than the height of a conventional doorway (e.g. about eighty inches). The lower contact end 26 is positioned against the floor surface 22 beneath the upper door member 24, and the upper end portion 28 is pressed upwardly against the downwardly facing surface 25 of the upper door member 24. Then the locking knob 52 is rotated to cause the insert 60 to move so as to press the upper telescoping member 40 against the inside surface of the side wall 46 of the main post 38.

The next step is to position the laser instrument 18 at the desired height. This is accomplished by moving the locking knob 72 to a release position so that the post engaging portion 30 can be moved along the main post 38 (which functions as a guideway) to the proper elevation. The locking knob 72 is rotated into locking engagement; the laser instrument is adjusted so as to be in a horizontal position, and the laser instrument 18 is activated to cause it to direct its beam laterally against its surrounding wall surfaces.

Usually, the carpenter can make a fairly close approximation of the proper level of the laser instrument 18 by moving the post engaging member 30 to its desired position by using the reference line 86 so that this line 86 is at the desired height elevation. Then an up or down adjustment can be made as needed.

It sometimes happens that the floor of the room may be slanted to a small extent. In this instance, the carpenter installing the cabinet may want to make allowance for this by inserting shims or other leveling devices to bring the cabinet to a horizontal alignment within closer tolerances. Let us assume that the carpenter has measured up a certain height from the floor and has ascertained the target level for the countertop. The workman will then make a final adjustment to the mounting section 16, moving it a short distance upwardly or downwardly so that the laser beam is at precisely the proper height elevation.

A typical instrument which could be used in the present invention which in one made by MOMENTOM LASER. This instrument transmits a beam which has a vertical thickness dimension of about ⅛ inch, and is sufficiently bright to be readily observable in most all building interiors. The beam scans along the wall, and it is a very simple matter to match the height of the beam to a marking on the wall, and/or place the marking at the appropriate place where the laser strikes the wall.

In this particular instrument, the laser beam makes an entire scan of the wall surface about 200 times per minute. Accordingly, the carpenter has a substantially constant reference line, accurately located and easily readable. Then the carpenter proceeds with the work of properly positioning the cabinets and countertops to the proper location and then completing the installation.

In some instances, a nearby doorway is not available, so that the apparatus 10 need to be installed so as to reach from the floor surface 22 to a ceiling surface. The apparatus 10 is arranged so that the inner-telescoping section 40 can be extended out to almost seventy inches beyond the more normal eighty inch length dimension that would be expected in doorways. This extension is accomplished as indicated above by moving the telescoping section 40 upwardly so that the upper bearing end 28 comes into engagement with the ceiling, and then operating the locking mechanism 50 to maintain the pole section 14 in its operating position.

It will be noted, with reference to FIG. 1 that the mounting section 16 is arranged so that the mounting member 112 and the laser instrument 18 are spaced laterally from the post section 14 is a sufficient distance so that the laser instrument 18 can be positioned at an elevation above the bearing surface 25 when the post 14 is mounted in the doorway. (See FIG. 2). In the event that the laser beam is to be positioned at a very low level adjacent to the floor surface 22, as indicated in FIG. 4, the intermediate mounting member 112 can be inverted, and the laser platform 34 can be placed at what now becomes the upper surface of the horizontal plate 114, as shown in FIG. 10.

From time to time, it may be desired to make small adjustments in the height of the laser instrument 18. For example, the carpenter may make a measurement on the wall and desire to move the reference level up by ⅜ of an inch. In this instance, the carpenter could observe the present location of the reference line 86, make a simple calculation to find the desired elevation, and then move the mounting section 16 up until the reference line 86 matches the proper calculated measurement. After that, the carpenter may wish to make a further adjustment by simply moving the clear plastic plate 82 itself so as to move the reference line 86 to an elevation marking that corresponds exactly to the desired reference elevation on the wall. For example, the floor location where the apparatus 10 is positioned may be a slight distance below what is desired. Yet, the carpenter wants to set the reference line 86 so that it is at the dimension which corresponds with the height dimension at the actual installation location adjacent to the wall. This can be done by simple adjustment to the plate 82, while leaving the mounting section 16 in its proper position.

FIGS. 11–14 show a second embodiment of the present invention. Components of the second embodiment which are similar to the first embodiment will be given like numerical designations, with an "a" designation distinguishing those of the second embodiment.

FIG. 12 is a cross-sectional view of the post 14a showing the two telescoping post sections 38a and 40a and the post locking mechanism 50a, and FIG. 13 is a cross-sectional view through the post 14a where the locking mechanism 70a is located.

The post section of 38a has a square tubular cross-sectional configuration, and likewise the inner post section 40a has a matching square cross-sectional configuration. The outer wall of the inner telescoping member 40a is spaced a short distance inwardly from the inner wall of the outer telescoping section 38a leaving a small width gap 150. A plurality of pads 152 are positioned between the members 38a and 48a to provide proper sliding engagement.

The locking device 50a comprises a handle 52a secured to a bolt 62a that is threaded into an insert 60a. By rotating the handle 52a, the inner tube section 40a can be locked in place. The bolt 62a is at a 45 degree angle to the adjacent sidewalk and leans against a matching flattened and concave edge portion.

FIG. 13 is a cross-sectional view taken at the location of the mounting section 18 on the post section 40a. More particularly, this section is taken at the location of the locking mechanism 70a of the post engaging section 30a. There is a handle 32a attached to a bolt 74a which in turn engages a elongate insert 154 (shown in FIG. 14). This insert 154 has a bearing face 156 and top and lower protruding members 158. This insert 154 fits in a housing section 160, this being an elongate member having a U-shaped cross-section extending the length of the mounting section 18.

The bearing surface 156 presses against a matching bearing surface 162 which is aligned at 45 degrees from the two adjacent wall sections of the post section 40a, this bearing surface 162 comprising a flattened edge corner portion of the post section 40a.

In operation, the handle 72a is rotated to cause the bearing end of the bolt 14a to engage the insert 154 to press the bearing surface 156 into engagement with the bearing surface 162 to hold the post engaging portion 30a securely in place. Pads 164 are provided to provide for proper sliding engagement, and also to securely hold the post engaging portion 30a in place.

It is to be recognized that various modifications could be made to the present invention without departing from the basic teachings thereof. For example, the cross-sectional configurations in relative positioning of the main post 38 and the extendible member 40 could be modified to different cross-sectional configurations and relative positions. For example, the components could be made as an I beam section, matching S sections or U sections, etc. Further, the precise means of making the vertical extensions could be modified, such as by placing a screw jack member adjacent to the bottom portion of the post. While the post engaging member 30 is shown as having a slide mount where it encloses the post 38, this could be made more in the form of a wheeled member that travels up and down a post having a more rail-like structure. Further, the intermediate mounting members could have different adjustments, both vertical and angular added thereto. It is to be recognized that such modifications are intended to be included within the broader scope of the present invention.

What is claimed is:

1. A laser leveling assembly to establish height locations at selected locations, and adapted for use at a location where there is a lower upwardly facing support surface and an upper downwardly facing bearing surface, such as a building structure having a floor support surface and an upper bearing surface, such as an upper section of a doorway, a ceiling or an upper panel or member, said assembly comprising:

a) a laser instrument to transmit a horizontally directed laser beam at laterally spaced locations to indicate a selected elevation or elevations at such spaced locations;

b) a mounting post having a longitudinal axis and comprising:
   i. a lower contact end portion arranged to engage said lower support surface to establish a lower mounting location for said post;
   ii. an upper contact end portion arranged to engage said upper bearing surface to establish an upper mounting location for said post so that the post can be positioned between the upper and lower locations so as to have a substantial vertical alignment component;
   iii. said mounting post providing a guideway extending along said longitudinal axis; wherein
   iv. an effective length of the post is changed to accommodate different distances between the first and second fixed surfaces;
c) an instrument mounting device mounted to said post for movement along said guideway to a selected height position or positions, and arranged to support said instrument in an operating position where the instrument can transmit said laser beam toward laterally spaced locations.

2. The assembly as recited in claim 1, where at least one of said contact ends is longitudinally adjustable so that the contact ends can be moved toward and away from one another.

3. The assembly as recited in claim 1, wherein said post comprises a first elongate post section having said lower contact end portion, and a second post section telescopically engaging said first post section and having said upper contact end portion.

4. The assembly as recited in claim 3, wherein said mounting device comprises:
   i. a post engaging portion arranged to be fixedly positioned to the post and arranged to be able to move along said guideway of the post;
   ii. an instrument mounting portion arranged to mount the instrument in its operating position;
   iii. an intermediate mounting portion connecting said post engaging portion and said instrument mounting portion.

5. The assembly as recited in claim 4, wherein said intermediate mounting portion is arranged so that said instrument mounting portion can be located at different vertical locations relative to said post engaging portion.

6. The assembly as recited in claim 5, wherein said intermediate mounting portion comprises a support arm rotatably mounted so as to be able to rotate between an upper arm position to support said instrument mounting portion in an upper location and a lower arm location to support said instrument mounting portion at a lower location.

7. The assembly as recited in claim 4, wherein said intermediate mounting portion comprises a laterally extending offset mounting portion to locate the instrument mounting portion at a location spaced laterally from said mounting post so that the intermediate mounting portion would be able to move clear of an object located closely adjacent to said mounting post.

8. The assembly as recited in claim 7, wherein said intermediate mounting portion comprises a vertically oriented mounting portion to be able to support said instrument mounting portion at height locations spaced vertically from the post engaging portion.

9. The assembly as recited in claim 8, wherein said vertically oriented mounting portion is adjustable so as to be able to position the instrument mounting portion either above or below the elevation of the post engaging portion.

10. A The assembly as recited in claim 3, wherein said first and second post sections each has a generally rectangular cross-section, and at least one of a longitudinal edge portion of the first post section and an adjacent longitudinal edge portion of the second post section comprises a flattened edge surface portion, said assembly further comprising a post locking section comprising a thread mounted locking member which can be rotated into and out of locking engagement between said first and second post sections and coming into engagement with the flattened surface portion.

11. The assembly as recited in claim 10, wherein there is an instrument mounting locking device comprising a rotatable threaded locking member in operative engagement between the instrument mounting device and the post, so as to be rotatable to come into locking engagement between the instrument mounting device and the post.

12. The assembly as recited in claim 1, wherein said mounting post has an elevation indicating portion extending along the longitudinal axis of the post to indicate vertical location relative to the post, said mounting device having a height indicating device positioned to enable height location of the mounting device to be determined.

13. The assembly as recited in claim 12, wherein said elevation indicating portion has indicia increasing from a lower location to an upper location to indicate distance from a lower surface location, and also indicia increasing from an upper location toward a lower location to indicate distance from the upper location to the lower location.

14. The assembly as recited in claim 12, wherein said mounting device comprises a post engaging portion extending at least partially around said post, and having said height indicating device positioned adjacent to the elevation indicating portion.

15. The assembly as recited in claim 14, wherein said height indicating device is mounted so as to be vertically adjustable relative to said post engaging portion.

16. The assembly as recited in claim 15, wherein said height indicating device comprises a vertically movable transparent member with a height indicator thereon.

17. The assembly as recited in claim 1, wherein said mounting post comprises a first telescoping member and a second telescoping member mounted within said first telescoping member, said assembly further comprising a post locking and stabilizing device comprising a rotatable threaded member which is mounted to said post and which can be rotated into and out of locking engagement to exert a lateral force relative to said telescoping members when in locking engagement, said assembly further comprising a mounting locking device which operably engages said mounting device and said post and which comprises a rotatably threaded member to come into locking engagement between said instrument mounting device and said post.

18. Method to establish height locations at selective locations, and adapted to be employed at a location where there is a lower upwardly facing support surface and upper downwardly facing bearing surface, such as a building structure having a floor support surface and an upper bearing surface, such as an upper section of a doorway, a ceiling or an upper panel or member, said method comprising:
   a) mounting a laser instrument to an instrument mounting device and mounting the mounting device to a mounting post having a longitudinal axis;
   b) placing a lower contact end of said post to engage said lower support surface to establish a lower mounting location for said post means;
   c) arranging an upper contact end portion of the post such that the post is substantially vertical and extending the effective length of the the post such that the upper contact end portion of said post engages said upper bearing surface to establish an upper mounting location for said post so that the post is positioned between the upper and lower locations so as to have a substantial vertical alignment component, with said mounting post providing a guideway extending along said longitudinal axis;

d) positioning said instrument mounting device along said guideway to a selected height position or positions, with said instrument in an operating position;

e) operating said laser instrument to transmit a laser beam at a laterally spaced location or locations to indicate a selected elevation or elevations at such location or locations.

19. The method as recited in claim 18, wherein said intermediate mounting portion is arranged so that said instrument mounting portion can be located at different vertical locations relative to a post engaging portion where the instrument mounting device is mounted to the post, said method comprising rotating said mounting portion to an upper or lower location so that said laser instrument can operate at positions both above and below the location at which the instrument mounting portion is engaging the post.

20. A leveling assembly adapted to be used with a laser instrument to establish height locations at selected locations, and adapted for use at a location where there is a lower upwardly facing support surface and an upper downwardly facing bearing surface, such as a building structure having a floor support surface and an upper bearing surface, such as an upper section of a doorway, a ceiling or an upper panel or member, said assembly comprising:

a) a mounting post having a longitudinal axis and comprising:
  i. a lower contact end arranged to engage said lower support surface to establish a lower mounting location for said post;
  ii. an upper contact end portion arranged to engage said upper bearing surface to establish an upper mounting location for said post so that the post can be positioned between the upper and lower location so as to have a substantial vertical alignment component;
  iii. said mounting post providing a guideway extending along said longitudinal axis; and
  iv. an effective length of the post is changed to accommodate different distances between the floor support surface and the upper bearing surface;

b) an instrument mounting device mounted to said post for movement along said guideway to a selected height position or positions, and having a laser instrument supporting portion to support said instrument in an operating position where the laser instrument is able to transmit a horizontally directed laser beam at a laterally spaced location to indicate a selected elevation or elevations at such location or locations.

21. A laser leveling assembly particularly adapted to support a laser instrument and function with the laser instrument to establish height locations at selected locations, by means of a laser beam of the laser instrument, and adapted for use at a location where there is a lower upwardly facing support surface and an upper downwardly facing bearing surface such as a building structure having a floor support surface and an upper bearing surface, such as an upper section of a doorway, a ceiling or an upper panel or member, said assembly comprising:

a) a mounting post having a longitudinal axis and comprising:
  i. a lower contact end portion arranged to engage said lower support surface to establish a lower mounting location for said post;
  ii. an upper contact end portion arranged to engage said upper bearing surface to establish an upper mounting location for said post;
  iii. said post being arranged so that the upper and lower contact end portions are extended or retracted with respect to one another so that the post can be positioned between the upper and lower locations so as to have a substantial vertical alignment component, and so that the upper and lower contact end portions can be positioned in engagement with the upper bearing surface and the lower support surface to hold the post between the upper and lower locations;
  iv. said mounting post providing a guideway extending along said longitudinal axis; and
  v. an effective length of the post is changed to accommodate different distances between the floor support surface and the upper bearing surface;

b) an instrument mounting device mounted to said post for movement along said guideway to a selected height position or positions, and arranged to support said instrument in an operating position where the instrument can transmit said laser beam toward laterally spaced locations.

22. A method to establish height locations at selected locations, and adapted to be employed at a location where there is a lower upwardly facing support surface and upper downwardly facing bearing surface, such as a building structure having a floor support surface and an upper bearing surface, such as an upper section of a doorway, a ceiling or an upper panel or member, said method comprising:

a) mounting a laser instrument to an instrument mounting device and mounting the mounting device to a post having a longitudinal axis, an upper end contact portion and a lower end contact portion;

b) placing a lower contact end portion of said post to engage said lower support surface to establish a lower mounting location for said post;

c) arranging an upper contact end portion of the post such that the post is substantially vertical and extending the effective length of the the post such that the upper contact end portion of said post engages said upper bearing surface to establish an upper mounting location for said post so that the post is positioned between the upper and lower locations, with said post providing a guideway extending along said longitudinal axis;

d) positioning said instrument mounting device along said guideway to a selected height position or positions, with said instrument in an operating position;

e) operating said laser instrument to transmit a laser beam at a laterally spaced location or locations to indicate a selected elevation or elevations at such location or locations.

23. A laser leveling assembly to establish height locations at selected locations, and adapted for use at a location where there is a lower upwardly facing support surface and an upper downwardly facing bearing surface, such as a building structure having a floor support surface and an upper bearing surface, such as an upper section of a doorway, a ceiling or an upper panel or member, said assembly comprising:

a) a laser instrument to transmit a horizontally directed laser beam at laterally spaced locations to indicate a selected elevation or elevations at such spaced locations;

b) a mounting post having a longitudinal axis and comprising:

i. a lower contact end arranged to engage said lower support surface to establish a lower mounting location for said post;

ii. an upper contact end portion arranged to engage said upper bearing surface to establish an upper mounting location for said post;

iii. said post being arranged so that the upper and lower contact end portions are extended or retracted with respect to one another so that the post can be positioned between the upper and lower locations so as to have a substantial vertical alignment component, and so that the upper and lower contact end portions can be positioned in engagement with the upper bearing surface and the lower support surface to hold the post between the upper and lower locations;

iv. said mounting post providing a guideway extending along said longitudinal axis; and v. an effective length of the post is changed to accommodate different distances between the floor support surface and the upper bearing surface;

c) an instrument mounting device mounted to said post for movement along said guide way to a selected height position or positions, and arranged to support said instrument in an operating position where the instrument can transmit said laser beam toward laterally spaced locations.

24. A leveling assembly for establishing a desired height location on a target surface, where the target surface is adjacent to first and second fixed surfaces, the leveling assembly comprising:

a light emitting instrument adapted to transmit a directed light beam;

a post having first and second end portions arranged to engage the first and second fixed surfaces such that a position of the post relative to the first and second fixed surfaces is substantially fixed, where an effective length of the post may be changed to accommodate different distances between the first and second fixed surfaces; and an instrument mounting device that engages the post such that the instrument mounting device may be selectively fixed to the mounting post at a desired post location; wherein the light emitting instrument is mounted to the instrument mounting device such that, when the instrument mounting device is fixed to the mounting post at the desired post location, the light beam illuminates the desired height location on the target surface.

25. A leveling assembly as recited in claim 24, in which:
the post defines a longitudinal axis; and
the instrument mounting device is selectively mounted on the post such that the instrument may move along the longitudinal axis of the post.

26. A leveling assembly as recited in claim 25, in which the instrument mounting device comprises a locking device that allows the position of the instrument mounting device relative to the post to be selectively fixed.

27. A leveling assembly as recited in claim 25, in which at least one of the post and the instrument mounting device defines a slot that receives a portion of the other of the post and the instrument mounting device to allow movement of the instrument mounting device relative to the post along the longitudinal axis of the post but such that movement of the instrument mounting device away from the longitudinal axis of the post is inhibited.

28. A leveling assembly as recited in claim 24, in which the post further comprises a post locking device that fixes the effective length of the post at a desired length.

29. A leveling assembly as recited in claim 24, in which the light emitting device is a laser.

30. A leveling assembly as recited in claim 24, in which the light emitting device comprises a rotating device for moving the light beam relative to the pole such that the light beam forms a line on the target surface.

31. A leveling assembly as recited in claim 24, in which the light emitting device comprises a self-leveling device that directs the light beam along a substantially horizontal path.

32. A support assembly for a rotary laser that generates a light line, where the support assembly supports the rotary laser assembly such that a light line emitted by the rotary laser establishes a desired reference line on a target surface and the target surface is adjacent to first and second fixed surfaces, the support assembly comprising:

a post having first and second end portions arranged to engage the first and second fixed surfaces such that a position of the post relative to the first and second fixed surfaces is substantially fixed, where an effective length of the post may be changed to accommodate different distances between the first and second fixed surfaces; and an instrument mounting device comprising
a mounting portion that engages the post such that the instrument mounting device may be selectively fixed to the mounting post at a desired post location, and
an intermediate portion that engages the mounting portion such that the intermediate portion may be selectively fixed to the mounting portion at a desired mounting angle; wherein
the rotary laser is mounted to the intermediate portion such that, when the instrument mounting device is fixed to the mounting post at the desired post location and the intermediate portion is fixed to the mounting portion at the desired mounting angle, the light line emitted by the rotary laser illuminates the desired reference line on the target surface.

33. A support assembly as recited in claim 32, in which:
the post defines a longitudinal axis; and
the mounting portion is selectively mounted on the post such that the instrument may move along the longitudinal axis of the post.

34. A support assembly as recited in claim 33, in which at least one of the post and the mounting portion defines a slot that receives a portion of the other of the post and the mounting portion to allow movement of the instrument mounting device relative to the post along the longitudinal axis of the post but such that movement of the instrument mounting device away from the longitudinal axis of the post is inhibited.

35. A support assembly as recited in claim 32, in which the post comprises first and second post sections, where the first post section telescopically engages the second post section.

36. A support assembly as recited in claim 32, in which the post further comprises a post locking device that fixes the effective length of the post at a desired length.

37. A support assembly as recited in claim 32, in which the post comprises first and second post sections having first and second longitudinal axes, respectively, where the first post section engage and moves relative to the second post section such that the first and second longitudinal axes are substantially parallel as the effective length of the post is changed.

38. A method of establishing a desired location on a target surface arranged between a support surface and a bearing surface, the method comprising the steps of:

providing a post having first and second end portions;

arranging the post with tee first end portion engaging the support surface;

changing an effective length of the post such that the second end portion engages the bearing surface and fixes the post relative to the target surface;

mounting a light emitting instrument on the post;

operating the light emitting instrument to cause a light beam to impinge on the target surface; and adjusting a location of the light emitting instrument on the post such that the light beam impinges on the target surface at the desired location.

39. A method as recited in claim 38, further comprising the step of rotating the light emitting instrument such that the light beam forms a line at the desired location on the target surface.

40. A method as recited in claim 38, in which the step of mounting the light emitting instrument on the post further comprises the steps of:

providing a mounting assembly;

mounting the mounting assembly to the post; and mounting the light emitting instrument on the mounting assembly.

41. A method as recited in claim 40, in which:

the step of providing the mounting assembly comprises the steps of:

providing first and second mounting members; and rotatably attaching the first mounting member to the second mounting member;

the step of mounting the mounting assembly to the post comprises the step of mounting the first mounting member to the post such that the second mounting member rotates about a mounting axis relative to the post; and the step of mounting the light emitting instrument on the mounting assembly comprises the step of mounting the light emitting instrument to the second mounting member.

42. A method as recited in claim 38, further comprising the step of locking the effective length of the post to maintain the post in contact with the support surface and the bearing surface.

43. A method as recited in claim 38, in which:

the step of providing the post comprises the step of providing first and second post sections, where the first end portion is defined by the first post section and the second end portion is defined by the second post section;

the method further comprising the step of engaging the first and second post sections together such that the first and second post sections move relative to each other to change a distance between the first and second end portions and thus the effective length of the post.

\* \* \* \* \*